(12) United States Patent
Kim et al.

(10) Patent No.: US 10,592,192 B2
(45) Date of Patent: Mar. 17, 2020

(54) DISPLAY APPARATUS CONFIGURING MULTI DISPLAY SYSTEM AND METHOD FOR CONTROLLING THE SAME

(71) Applicant: Samsung Electronics Co., Ltd., Suwon-si (KR)

(72) Inventors: Dong-jin Kim, Suwon-si (KR); Seo-ye Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 15/840,640

(22) Filed: Dec. 13, 2017

(65) Prior Publication Data

US 2018/0165051 A1 Jun. 14, 2018

(30) Foreign Application Priority Data

Dec. 14, 2016 (KR) .................. 10-2016-0170188

(51) Int. Cl.
*G06F 3/14* (2006.01)
*G09G 5/00* (2006.01)
(Continued)

(52) U.S. Cl.
CPC .......... *G06F 3/1431* (2013.01); *G06F 3/1446* (2013.01); *G06F 11/0721* (2013.01);
(Continued)

(58) Field of Classification Search
CPC .. H04N 19/176; H04N 19/192; H04N 1/2179; H04N 1/3871; H04N 21/23602;
(Continued)

(56) References Cited

U.S. PATENT DOCUMENTS

2007/0011254 A1 1/2007 Otake
2007/0033289 A1 2/2007 Nuyttens et al.
(Continued)

FOREIGN PATENT DOCUMENTS

JP 2013-115528 6/2013
KR 10-2008-0012588 2/2008
(Continued)

OTHER PUBLICATIONS

Extended European Search Report dated May 3, 2018, in corresponding European Patent Application No. 17206103.8, 8 pgs.
(Continued)

*Primary Examiner* — Sanjiv D. Patel
(74) *Attorney, Agent, or Firm* — Staas & Halsey LLP (57) ABSTRACT

A display apparatus communicatively coupleable to a multi display system is provided. The display apparatus includes a display; a first connector configured to receive an image from a first display apparatus of the multi display system; a processor configured to perform a control so that a feedback signal that informs of a detection of an error is transmitted to the first display apparatus through the first connector when the error is detected in the received image, a compressed image in which the image is compressed is received from the first display apparatus in response to the feedback signal, and the received compressed image is decompressed to display the decompressed image through the display; and a second connector configured to transmit the compressed image to a second display apparatus of the multi display system.

20 Claims, 8 Drawing Sheets

(51) Int. Cl.
*G09G 5/14* (2006.01)
*G06F 11/07* (2006.01)

(52) U.S. Cl.
CPC ......... *G06F 11/0769* (2013.01); *G09G 5/006* (2013.01); *G09G 5/14* (2013.01); *G09G 2300/026* (2013.01); *G09G 2330/12* (2013.01); *G09G 2340/02* (2013.01); *G09G 2350/00* (2013.01); *G09G 2360/04* (2013.01); *G09G 2370/06* (2013.01); *G09G 2370/12* (2013.01)

(58) Field of Classification Search
CPC ........... H04N 21/2381; H04N 21/4342; H04N 21/43635; H04N 21/8186; H04N 21/8193; H04N 21/8458; G09G 2340/02; G09G 2370/042; G09G 2370/047; G09G 2370/10; G09G 2370/12; G09G 5/00; G09G 5/006; G09G 5/008
See application file for complete search history.

(56) References Cited

U.S. PATENT DOCUMENTS

| | | | |
|---|---|---|---|
| 2009/0265744 A1 | 10/2009 | Singh et al. | |
| 2009/0296731 A1* | 12/2009 | Lida | G06F 3/1454 370/449 |
| 2010/0045594 A1 | 2/2010 | Jenks et al. | |
| 2010/0171882 A1* | 7/2010 | Cho | H04N 19/67 348/608 |
| 2010/0278230 A1 | 11/2010 | MacInnis et al. | |
| 2010/0278271 A1* | 11/2010 | MacInnis | H04N 19/172 375/240.18 |
| 2011/0030025 A1* | 2/2011 | Bertonis | H04N 21/43637 725/118 |
| 2012/0096509 A1* | 4/2012 | Zeng | H03L 7/0807 725/127 |
| 2013/0038508 A1* | 2/2013 | Min | H04N 21/43635 345/1.1 |
| 2014/0016034 A1* | 1/2014 | Cirstea | H04N 7/108 348/460 |
| 2014/0094300 A1 | 4/2014 | Liu | |
| 2015/0145892 A1 | 5/2015 | Hong et al. | |
| 2015/0187333 A1 | 7/2015 | Loeffler et al. | |
| 2016/0093271 A1 | 3/2016 | Cho et al. | |
| 2016/0188278 A1 | 6/2016 | Lee et al. | |
| 2016/0286161 A1 | 9/2016 | Kabuto et al. | |
| 2017/0006336 A1* | 1/2017 | Lee | H04L 1/0045 |
| 2017/0115740 A1* | 4/2017 | Kim | G06F 3/017 |
| 2017/0115946 A1 | 4/2017 | Kim et al. | |

FOREIGN PATENT DOCUMENTS

| | | |
|---|---|---|
| KR | 10-2008-0016019 | 2/2008 |
| KR | 10-2009-0076020 | 7/2009 |
| KR | 10-1602879 | 3/2016 |
| KR | 10-2017-0046989 | 5/2017 |
| WO | 2006/041991 A2 | 4/2006 |

OTHER PUBLICATIONS

International Search Report dated Mar. 26, 2018, in corresponding International Patent Application No. PCT/KR2017/014241, 3 pgs.
Written Opinion of the International Searching Authority dated Mar. 26, 2018, in corresponding International Patent Application No. PCT/KR2017/014241, 5 pgs.

* cited by examiner

DISPLAY APPARATUS CONFIGURING MULTI DISPLAY SYSTEM AND METHOD FOR CONTROLLING THE SAME

CROSS-REFERENCE TO RELATED APPLICATIONS

This application claims priorities from Korean Patent Application No. 10-2016-0170188, filed on Dec. 14, 2016 in the Korean Intellectual Property Office, the disclosure of which is incorporated herein by reference in its entirety.

BACKGROUND

Field of the Invention

Apparatuses and methods consistent with the present disclosure relate to a display apparatus configuring a multi display system and a method for controlling the same, and more particularly, to a display apparatus configuring a multi display system through a transition minimized differential signaling (TMDS) channel and a method for controlling the same.

Description of the Related Art

In general, a display apparatus is a device displaying one or more images on one screen. However, the display apparatus may also perform a multi display function in which it is connected to a plurality of display apparatuses to display the image on a plurality of screens. A representative example of such a multi display system includes a video wall system.

A video wall means that the plurality of display apparatuses may operate as one display apparatus having a large screen by disposing the plurality of display apparatuses capable of outputting images in a plane shape to allow the plurality of display apparatuses to output a portion of one identical image transmitted from a source device. For example, the video wall is used to display an image in a form in which the respective display apparatuses configuring the video wall display the same image respectively, or display different images to be combined into one full image in an exposition, or the like. Such a video wall system is generally implemented in a loop out manner in which the connected display apparatus sequentially transmits the image to an adjacent display apparatus.

Meanwhile, when the image is transmitted by a transition minimized differential signaling (TMDS) manner, such a multi display system generally transmits the image through a high definition multimedia interface (HDMI) or a digital visual interface (DVI). In particular, HDMI, which transmits images and sound signals of a digital type using one cable, may easily transmit the images and sound signals using only a HDMI cable connecting between HDMI terminals. In recent, as a HDMI 2.0 standard supporting UHD images having resolution of 4K has emerged, the maximum bandwidth of data that may be transmitted through HDMI has been improved to 18 Gbps, and it is possible to transmit images that are smoothly driven at 60 Hz at resolution up to 4096×2160(2160p).

However, if the bandwidth used for image transmission exceeds the bandwidth supported by HDMI or DVI standards due to an installation environmental factor such as a source device, cable characteristics (defect of the cable, a support bandwidth of the cable), or the like, error occurs in the image to cause screen abnormal problems in that the screen does not appear or flickers. Since the image in which the error occurs is sequentially transmitted to the display apparatuses which are sequentially connected, screen abnormality occurs in all the display apparatuses receiving the corresponding image, starting from the display apparatus in which the error firstly occurs. As described above, in the conventional TMDS manner of the multi display system, since probability that the error occurs in the image is increased during the image transmission as the number of the connected display apparatuses is large, there is a limitation in the number of the display apparatuses capable of configuring the multi display system and it is difficult to transmit a high resolution image due to a problem of a bandwidth.

Accordingly, in a multi display system that transmits and receives the image in the TMDS manner particularly, it is required to search for a method for stably transmitting an ultra-high resolution image by implementing a loop out considering a state of the image signals.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus capable of automatically recovering a screen abnormal phenomenon in a multi display system, and a method for controlling the same.

According to an aspect of the present disclosure, a display apparatus communicatively coupleable to a multi display system includes a display; a first connector configured to receive an image from a first display apparatus of the multi display system; a processor configured to perform a control so that a feedback signal that informs of a detection of an error is transmitted to the first display apparatus through the first connector when the error is detected in the received image, a compressed image in which the image is compressed is received from the first display apparatus in response to the feedback signal, and the received compressed image is decompressed to display the decompressed image through the display; and a second connector configured to transmit the compressed image to a second display apparatus of the multi display system.

The processor may control the display to transmit the received image to the second display apparatus and display the received image when no error is detected in the received image.

The processor may compress the image received from the first display apparatus when the feedback signal that informs the detection of the error is received from the second display apparatus, and re-transmit the compressed image to the second display apparatus.

The error is detected during transmission of the image, and the first connector and the second connector may transmit and receive the image in a transition minimized differential signaling (TMDS) manner.

The first connector and the second connector may transmit to and receive the image from the first display apparatus and the second display apparatus through a TMDS based high definition multimedia interface (HDMI) or digital visual interface (DVI) cable.

The processor may transmit and receive the feedback signal using a consumer electronics control (CEC) channel, when the first connector and the second connector transmit and receive the image through the HDMI cable.

The processor may transmit and receive a toggle signal of a general purpose input/output (GPIO) port as the feedback signal, when the first connector and the second connector transmit and receive the image through the DVI cable.

The processor may determine whether the error occurs during transmission of the image by using any one or more error detection method of a parity bit, a checksum, and cyclic redundancy checks (CRC).

The processor may compress the received image and transmit the compressed image to the second display apparatus, when determining that a bandwidth required to transmit the image is close to a bandwidth supported by the HDMI or the DVI, based on a frequency of the received image.

The processor may compress the received image by changing a compression rate based on characteristic information of the error detected.

According to another aspect of the present disclosure, a method for controlling a display apparatus communicatively coupleable to a multi display system includes receiving an image from a first display apparatus of the multi display system through a first connector; transmitting a feedback signal that informs of a detection of the error to the first display apparatus through the first connector when the error is detected in the received image; receiving a compressed image in which the image is compressed from the first display apparatus in response to the feedback signal; and decompressing the received compressed image to display the decompressed image and transmitting the compressed image to a second display apparatus of the multi display system through a second connector.

The method may further include transmitting the received image to the second display apparatus and displaying the received image when no error is detected in the received image.

The method may further include compressing the image received from the first display apparatus when the feedback signal that informs the detection of the error is received from the second display apparatus; and re-transmitting the compressed image to the second display apparatus.

The error is detected during transmission of the image, and the first connector and the second connector may transmit and receive the image in a transition minimized differential signaling (TMDS) manner.

The first connector and the second connector may transmit to and receive the image from the first display apparatus and the second display apparatus through a TMDS based high definition multimedia interface (HDMI) or digital visual interface (DVI) cable.

The feedback signal may be a signal transmitted and received through a consumer electronics control (CEC) channel when the image is transmitted and received through the HDMI cable.

The feedback signal may be a signal transmitted and received by toggling a general purpose input/output (GPIO) port when the image is transmitted and received through the DVI cable.

In the transmitting of the feedback signal, determining whether the error occurs during transmission has occurred may be determined by using any one or more error detection method of a parity bit, a checksum, and cyclic redundancy checks (CRC).

The method may further include determining whether a bandwidth required to transmit the image is close to a bandwidth supported by the HDMI or the DVI based on a frequency of the received image when no error is detected in the received image; and compressing the received image and transmitting the compressed image to the second display apparatus when it is determined that the bandwidth required to transmit the image is close to the bandwidth supported by the HDMI or the DVI.

In the compressing of the image, the received image may be compressed by changing a compression rate based on characteristic information of the error detected.

According to the diverse exemplary embodiments of the present disclosure, in the multi display system of the TMDS manner, the number of the display apparatuses capable of displaying the high resolution image may be increased.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Before specifically describing the present disclosure, a method for demonstrating the present specification and drawings will be described.

First, as terms used in the present specification and claims, general terms have been selected by considering functions in diverse exemplary embodiments of the present disclosure. However, such terms may be varied depending on an intention of those skilled in the art, a legal or technical interpretation, an emergence of a new technology, and the like. Further, some terms may be terms which are arbitrarily selected by an applicant. Such terms may be interpreted as meanings defined in the present specification, and may also be interpreted based on general contents of the present specification and a typical technical concept in the art unless the terms are not specifically defined.

Further, the same reference numerals or symbols described in the accompanying drawings of the present specification denote parts or components that perform substantially the same function. For convenience of explanation and understanding, the description will be provided using the same reference numerals or symbols in different exemplary embodiments. That is, although a plurality of drawings illustrate all of the components having the same reference numeral, the plurality of drawings do not mean one exemplary embodiment.

In addition, in order to distinguish between the components, terms including an ordinal number such as "first", "second", etc. may be used in the present specification and claims. The ordinal number is used to distinguish the same or similar components from each other, and the meaning of the terms should not be interpreted as being limited due to the usage of the above-mentioned ordinal number. As an example, the components coupled to the ordinal number should not be interpreted as a use order, a layout order, or the like being limited by the number. The respective ordinal numbers are interchangeably used, if necessary.

In the present specification, the singular expression includes the plural expression unless the context clearly indicates otherwise. In the present application, the terms "include" or "consist of" designate the presence of features, numbers, steps, operations, components, elements, or a combination thereof that are written in the specification, should be understood that they do not exclude the presence or possibility of addition of one or more other features, numbers, steps, operations, components, elements, or a combination thereof.

A term "module", "unit", "part", or the like, in the exemplary embodiment of the present disclosure is a term for referring to the component performing at least one function or operation, and such component may also be implemented in hardware or software or a combination of hardware and software. In addition, a plurality of "modules", "units", "parts", or the like may be integrated into at least one module or chip and may be implemented in at least one processor (not illustrated), except for a case in which they need to be each implemented in individual specific hardware.

In addition, in the exemplary embodiment of the present disclosure, it will be understood that when an element is referred to as being "connected to" another element, it can be directly "connected to" the other element or other elements intervening therebetween may be present. In addition, unless explicitly described otherwise, "comprising" any components will be understood to imply the inclusion of other components rather than the exclusion of any other components.

Hereinafter, the present disclosure will be described in detail with reference to the accompanying drawings.

Figure 1:
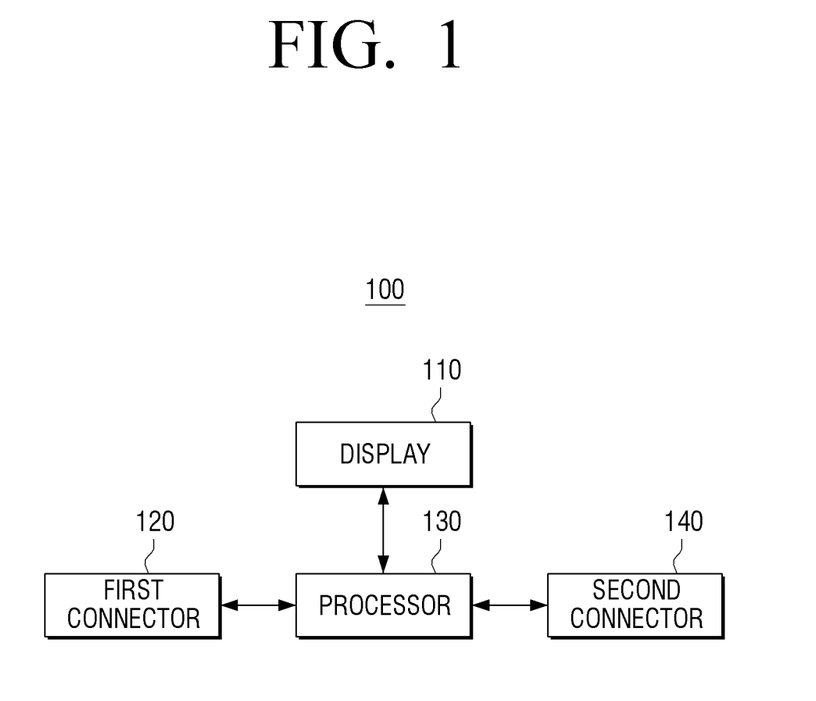
FIG. 1 is a block diagram briefly illustrating a configuration of a display apparatus configuring a multi display system according to an exemplary embodiment of the present disclosure.

FIG. 1 is a block diagram briefly illustrating a configuration of a display apparatus configuring a multi display system according to an exemplary embodiment of the present disclosure.

Referring to FIG. 1, a display apparatus 100 configuring a multi display system according to an exemplary embodiment of the present disclosure includes a display 110, a first connector 120, a processor 130, and a second connector 140.

Here, the multi display system refers to a system in which a plurality of display apparatuses operate as one screen to display one image, or to each display a plurality of images. A representative example of the multi display system includes a video wall system in which a plurality of display apparatuses are stacked to form a large screen and an image signal is received from a source device to display various images on the large screen. Hereinafter, the video wall system will be described as an example of the multi display system. However, the present disclosure is not limited to the video wall system, but may also be applied to various display systems that display one or a plurality of images using a plurality of display apparatuses. It should be understood that the term video wall may be replaced by various terms having the same meaning as displaying images by connecting a plurality of display apparatuses such as multivision and multi display. Further, the multi display system includes a source device supplying the image and a sink device displaying the image in the general multi display system, wherein the sink device may correspond to the display apparatus described in the present disclosure.

The display apparatus 100 may include various types of devices like portable terminal which may be easily carried by an individual and may output a predetermined image signal such as PDA and PMP, as well as devices fixedly disposed to specific places such as TV, a desktop PC, and the like.

The display 110 is a component displaying the image based on the image signal processed by the processor 130. The display 110 may include various types of displays capable of displaying the image such as a cathode ray tube (CRT), a liquid crystal display (LCD), a light emitting diode (LED), and a plasma display panel (PDP). The display 110 may further include additional components depending on the implementation manner thereof. For example, in a case in which the display 110 is implemented in a liquid crystal manner, the display 110 may include an LCD display panel (not illustrated), a backlight unit (not illustrated) that supplies light to the LCD display panel, and a panel driving substrate (not illustrated) that drives a panel (not illustrated).

The first connector 120 is a component through which the image signal is received from the display apparatus or the source device which is adjacent to the display apparatus 100, and the second connector 140 is a component through which the image signal is transmitted to the display apparatus which is adjacent to the display apparatus 100. Briefly, the first connector 120 may be referred to as an input terminal and the second connector 140 may be referred to as an output terminal. Here, the source device, which is a device capable of transmitting the image signal to any one display apparatus of the plurality of display apparatuses configuring the multi display system, may include a personal computer (PC), a DVD player, a BD player, a PVR external server, and a web server.

The first connector 120 and the second connector 140 transmit and receive the image in a transition minimized differential signaling (TMDS) manner. TMDS, which is a technology transmitting high speed parallel data, is used in image interfaces referred to as a digital visual interface (DVI) and a high definition multimedia interface (HDMI). In order to transmit and receive the image in the TMDS manner, the first connector 120 and the second connector 140 may be implemented as any one interface of HDMI or DVI. The first connector 120 and the second connector 140 may transmit and receive the image with an adjacent source device or another adjacent display apparatus through a HDMI or DVI cable. Specifically, the first connector 120 may correspond to an input terminal receiving the image and the second connector 140 may correspond to an output terminal transmitting the image to the other display apparatus. In a case in which the image is received from the source device, the display apparatus 100 will be a first display apparatus based on the order sequentially receiving the image in the plurality of display apparatuses configuring the multi display system.

The processor 130 is a component that controls an overall operation of the display apparatus 100. In particular, the processor 130 may process the image corresponding to the display apparatus 100 from the images which are input from a first display apparatus 200 which is adjacent to the display apparatus 100. Here, the first display apparatus 200, which is a display transmitting the images to the display apparatus 100, corresponds to a previous display apparatus of the display apparatus 100 based on the order in which the images are transmitted. Meanwhile, a device receiving the images from the first display apparatus 200 is referred to as a second display apparatus 300, and the second display apparatus 300 corresponds to a subsequent display apparatus of the display apparatus 100 based on the order in which the images are transmitted. To distinguish from the display apparatus 100 according to the present disclosure, the previous display apparatus and subsequent display apparatus of the display apparatus 100 are each referred to as the first display apparatus 200 and the second display apparatus 300 for the sake of convenience, but the display apparatus 100 according to the present disclosure and the first and second display apparatuses 200 and 300 are not devices having different configurations and share the same characteristics claimed in the present disclosure. That is, the respective display apparatuses 100, 200, and 300 included in the multi display system do not affect the implementation of the technical idea of the present disclosure even if the positions thereof are changed.

Meanwhile, the processor 130 may extract necessary information from the input image and may generate various instructions necessary to control the display apparatus 100. When the display apparatus 100 is waked up, the processor 130 may transmit a wake up signal to the second display apparatus 300 connected to the second connector 140 to switch the corresponding second display apparatus 300 into an operation state.

The processor 130 may extract information necessary to process the input images by de-packaging and parsing, and may perform re-packaging for the parsed image when the parsing is completed to transmit the re-packaged image to the second display apparatus 300.

Further, the processor 130 may generate an image corresponding to the display apparatus 100 by a method of cropping the input image into a plurality of images depending on the number of the display apparatuses configuring the multi display system and performing a scaling so as to correspond to resolution of the display apparatus 100. By the cropping, the remaining images other than a portion to be output from the display apparatus 100 may be removed from the input images. The processor 130 may scale the cropped image into a native resolution size of the display apparatus 100.

Meanwhile, the processor 130 of the display apparatus 100 according to an exemplary embodiment of the present disclosure may determine whether or not error occurs in an image during a process of receiving the image from the first display apparatus 200. The multi display system 1000 may be implemented to correct the error of the image occurred during transmission between the source device and the display apparatus or between the display apparatuses according to various error detection methods which are verified previously such as a parity bit, a checksum, and cyclic redundancy checks (CRC), and the processor 130 may determine whether or not the error has occurred in the image data using the various error detection methods described above.

In a case in which the error is detected in the received image, the processor 130 may transmit a feedback signal that informs error detection to the first display apparatus 200 through the first connector 120. When the first display apparatus 200 receives the feedback signal, the processor 130 may re-transmit the image which was transmitted to the display apparatus 100, and in this case, the first display apparatus 200 may compress the image to be re-transmitted to the display apparatus 100 and transmit the compressed image. The compressed image in which the compression is performed may be transmitted through the first connector 120 of the display apparatus 100.

That is, the first display apparatus 200 transmits the compressed image according to various compression rates such as 1/2 or 1/4 to the display apparatus 100 so that the bandwidth consumed to transmit the image is also reduced, and accordingly, possibility of the occurrence of the error occurring during the transmission of the image may be significantly reduced. Here, the compression rate may be variable according to the degree of error of the image.

When the display apparatus 100 receives the compressed image from the first display apparatus 200, the processor 130 may decompress the compression of the received compressed image and perform a control so that the decompressed image is displayed through the display 110. Further, the processor 130 may transmit the received compressed image to the second display apparatus 300 which is adjacent to the display apparatus 100, through the second connector 140. That is, the display apparatuses after the display apparatus in which the error of the image is detected may minimize the error occurring during the transmission of the image by receiving the compressed image.

Meanwhile, in a case in which the error is not detected in the received image, the processor 130 does not transmit the feedback signal to the first display apparatus 200, and may control the display 110 to display the received image. That is, since the case in which the error is not detected may be regarded that the problem in the transmission does not occur up to a point of time at which the image is received by the display apparatus 100, it is not necessary to again receive the received image.

Further, the processor 130 transmits the received image to the second display apparatus 300 and transmits the compressed image to the second display apparatus 300 when the display apparatus 100 receives the compressed image. However, even in a case in which the error is not detected in the received image, the display apparatus 100 may compress the received image to transmit the compressed image to the second display apparatus 300, which corresponds to a case in which it is determined that the error may occur during the transmission of the image to the second display apparatus 300 because a bandwidth necessary to transmit the image is close to the bandwidth supported by the cable. Here, the bandwidth is close to the bandwidth supported by the cable may mean that the bandwidth of the received image is a predetermined bandwidth or more based on the bandwidth supported by the cable, and the processor 130 may determine whether or not the bandwidth of the image is the predetermined bandwidth or more based on a frequency of the received image.

For example, as the frequency of the received image is distorted, the bandwidth used for transmission may exceed the bandwidth supported by the cable, and an increase in the bandwidth of the image used for transmission of the image may be caused by various factors such as a shortage of voltage supplied to the display apparatus, and the like. Here, even though the processor 130 does not receive the feedback signal from the second display apparatus 300, the processor 130 may compress the image in advance and transmit the compressed image to the second display apparatus 300.

Figure 2:
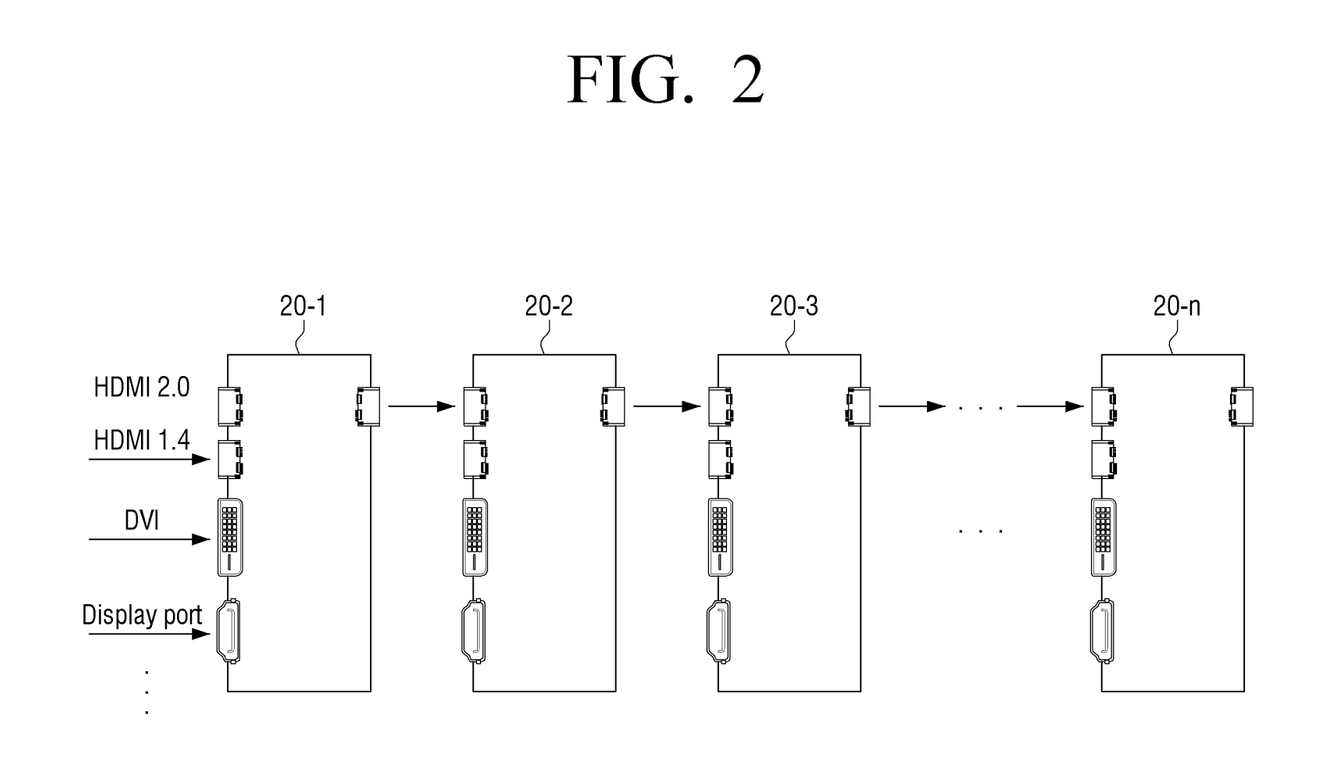
FIG. 2 is a diagram illustrating a multi display system connected by an input connector and an output connector according to an exemplary embodiment of the present disclosure.

FIG. 2 is a diagram illustrating a multi display system connected by an input connector and an output connector according to an exemplary embodiment of the present disclosure.

FIG. 2 illustrates a portion of a plurality of display apparatuses configuring a multi display system and the respective display apparatuses 20-1 to 20-n may sequentially receive, process, and output the image. The respective display apparatuses may include various types of input connectors such as HDMI 2.0, HDMI 1.4, DVI, and a display port (DP).

The respective display apparatuses may receive various formats of images from the source device and convert the received images into an HDMI format to transmit the converted images to an adjacent display apparatus. Specifically, the respective display apparatuses may manage audio and video signals between HDMI 2.0, HDMI 1.4, DVI and DP formats to enable a format conversion, and may further include a converter for the format conversion. The image which is once converted into the HDMI format is transmitted to the display apparatuses which are sequentially connected.

Figure 3:
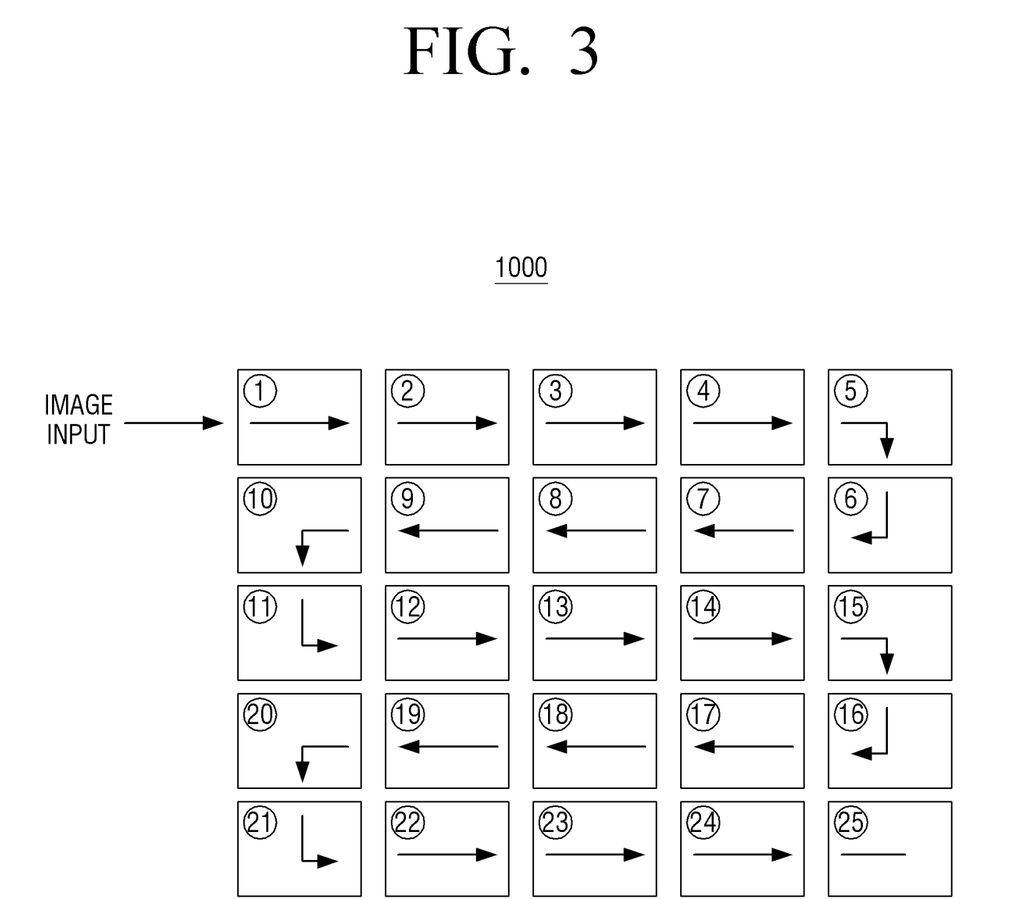
FIG. 3 is a diagram illustrating a signal flow diagram of the multi display system according to an exemplary embodiment of the present disclosure.

FIG. 3 is a diagram illustrating a signal flow diagram of the multi display system according to an exemplary embodiment of the present disclosure.

Specifically, FIG. 3 illustrates a video wall system 1000 including a display apparatus of 5×5 which is each connected to an input connector to which the image is input and an output connector from which the image is output. Referring to FIG. 3, when a display apparatus of No. 1 receives the image signal from the source device through the input connector, the image signal is output through the output connector positioned on a light surface of the display apparatus of No. 1 and is input through the input connector positioned on a left surface of a display apparatus of No. 2 which is adjacent to the display apparatus of No. 1.

Further, the image signal is output through the output connector positioned on a right surface of the display apparatus of No. 2 and is input to the input connector positioned on a left surface of a display apparatus of No. 3 which is adjacent to the display apparatus of No. 2. Therefore, the respective display apparatuses may be connected in series with each other though a plurality of pairs of input connectors and output connectors, and the image signal which is input to the display apparatus of No. 1 may be transmitted up to a display apparatus of No. 25.

However, the signal flow diagram illustrated in FIG. 3 is merely an example, and the image signal which is input to the display apparatus of No. 1 may be transmitted to the display apparatus of No. 25 through a display apparatus of No. 10, a display apparatus of No. 11, a display apparatus of No. 20, a display apparatus of No. 21, a display apparatus of No. 22, and a display apparatus of No. 19 in this order.

Further, according to the present exemplary embodiment, the video wall system including the plurality of display apparatuses may be implemented as the video wall system including a various number of display apparatuses such as 10×10, and the like as well as the video wall system of 5×5.

Figure 4:
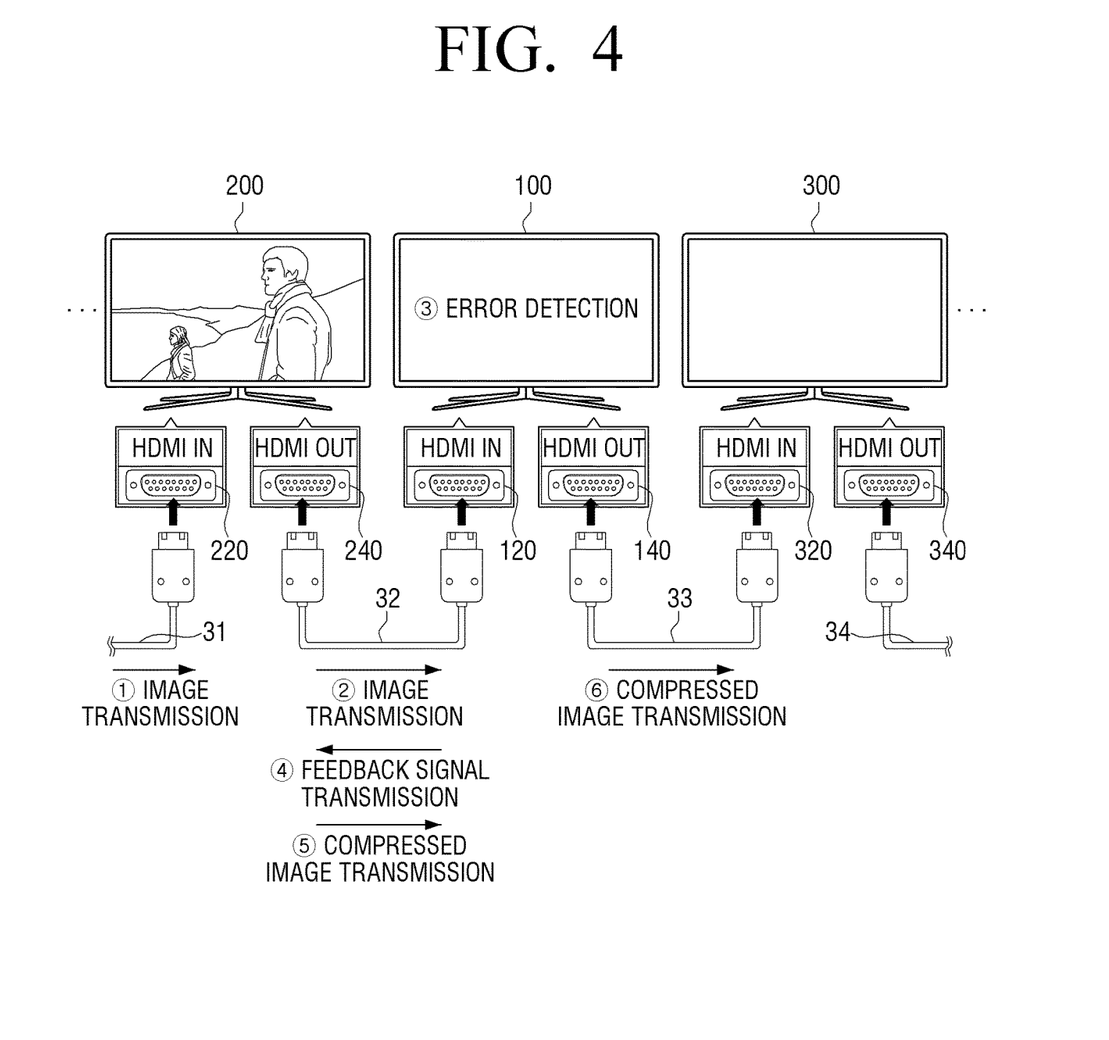
FIG. 4 is a diagram illustrating a method for transmitting a feedback signal and receiving a compressed image according to an exemplary embodiment of the present disclosure.

FIG. 4 is a diagram illustrating a method for transmitting a feedback signal and receiving a compressed image according to an exemplary embodiment of the present disclosure.

According to an exemplary embodiment illustrated in FIG. 4, the display apparatus 100 configuring the multi display system may be connected to a first display apparatus 200 and a second display apparatus 300 included in the multi display system. The first display apparatus 200 is adjacent to the left of the display apparatus 100 and transmits the image to the display apparatus 100, and the second display apparatus 300 is adjacent to the right of the display apparatus 100 and receives the image from the display apparatus 100. As mentioned above, the first display apparatus 200 and the second display apparatus 300 may be preferably interpreted as the same or similar device that shares the same technical features as the display apparatus 100 claimed in the present disclosure.

The multi display system including the respective display apparatuses 100 to 300 transmits and receives the images in the TMDS manner, and FIG. 4 illustrates an example in which the respective display apparatuses 100 to 300 are connected to each other through the HDMI cables. The display apparatus 100 includes a first connector 120 receiving the image from the first display apparatus 200 and a second connector 140 transmitting the image to the second display apparatus 300. The first display apparatus 200 includes a first connector 220 receiving the image from the source device or another adjacent display apparatus (a previous display apparatus) and a second connector 240 transmitting the image to the display apparatus 100. The second display apparatus 300 includes a first connector 320 receiving the image from the display apparatus 100 and a second connector 340 transmitting the image to another adjacent display apparatus (a subsequent display apparatus).

As illustrated in FIG. 4, HDMI cables 31 to 34 may connect the respective display apparatuses 100 to 300 configuring the multi display system with each other. The first connector 220 of the first display apparatus 200 is connected to the source device or another adjacent display apparatus through the HDMI cable 31, and the second connector 240 of the first display apparatus 200 is connected to the first connector 120 of the display apparatus 100 through the HDMI cable 32. The second connector 140 of the display apparatus 100 is connected to the first connector 320 of the second display apparatus 300 through the HDMI cable 33, and the second connector 340 of the second display apparatus 300 is connected to another adjacent display apparatus through HDMI cable 34.

The image to be displayed in the multi display system may be transmitted in the order of the first display apparatus 200, the display apparatus 100, and the second display apparatus 300. When the first display apparatus 200 receives the image through the first connector 220, the first display apparatus 200 may determine whether or not error during the transmission of the image has occurred in the received image. When the error during the transmission of the image is not detected, the first display apparatus 200 may display the received image and transmit the image to the first connector 120 of the display apparatus 100 connected through the second connector 240.

In this case, the error may occur in the transmitted image due to factors such as noise due to a defect of the HDMI cable 32 and a jitter phenomenon. For example, it may be assumed that a transmission bandwidth of the image supported by the HDMI cable becomes smaller than the bandwidth required for transmitting the image due to the defect of the HDMI cable 32. In this case, as a frequency of the transmitted image is increased, the image is not normally transmitted and the error occurs. Here, the processor 130 of the display apparatus 100 may determine whether or not the error occurs in the received image and detect the error. For example, the first display apparatus 200 may simultaneously transmit the image and checksum to the display apparatus 100, and the processor 130 may determine whether or not the error during the transmission of the image occurs using the checksum included in the image. The error of the received image may be detected by various error detection methods such as a parity bit, CRC, and the like as well as the method using the checksum.

In a case in which the error during the transmission is detected in the received image, the processor 130 may transmit a feedback signal that informs error detection to the first display apparatus 200 through the first connector 120. The manner of transmitting the feedback signal may be different between HDMI and DVI. For example, in a case in which the image is transmitted and received using the HDMI cable, since it is difficult to change the usage of a pin defined according to HDMI authentication, the processor 130 may transmit a specific instruction as the feedback signal through a consumer electronics control (CEC) pin of the HDMI cable 32.

Meanwhile, in a case in which the respective display apparatuses 100 to 300 configuring the multi display system transmit and receive the images through a DVI cable or a cable connected to a self-manufactured connector, since there is no authentication, the processor 130 may change the usage of the pin and transmit the feedback signal. Specifically, one of GND pins of the DVI cable is formed in a pulled-up structure and the processor 130 of the display apparatus 100 toggles a general purpose input/output (GPIO) port of the first connector 120 to low (0), thereby making it possible to transmit a corresponding toggle signal as the feedback signal.

When the first display apparatus 200 receives the feedback signal from the display apparatus 100, the corresponding image may be compressed according to various compression rates 1/2 or 1/4 based on an amount of detected error and the compressed image may be re-transmitted to the display apparatus 100.

The display apparatus 100 receiving the compressed image may decompress the compressed image, display the decompressed image through the display 110, and transmit the compressed image to the second display apparatus 300. Similarly to the display apparatus 100, the second display apparatus 300 may detect error during the transmission of the image in the received image, decompress the compress of the received image when the error is not detected, display the decompressed image, and transmit the received compressed image to the subsequent display apparatus connected to the second connector 340. Such processes may proceed in the same way when receiving the image in the display apparatuses which are sequentially connected to each other.

Meanwhile, in a case in which the error is not detected in the image received from the first display apparatus 200, the processor 130 of the display apparatus 100 may transmit the received image to the second display apparatus 300 and perform a control so that the received image is displayed. That is, in this case, the processor 130 does not transmit the feedback signal to the first display apparatus 200 nor receives the compressed image.

However, if the second display apparatus 300 detects the error in the received image and transmits the feedback signal that informs the error detection to the display apparatus 100 through the first connector 320, the processor 130 may compress the image received from the first display apparatus 200 and re-transmit the compressed image to the second display apparatus 300.

Figure 5:
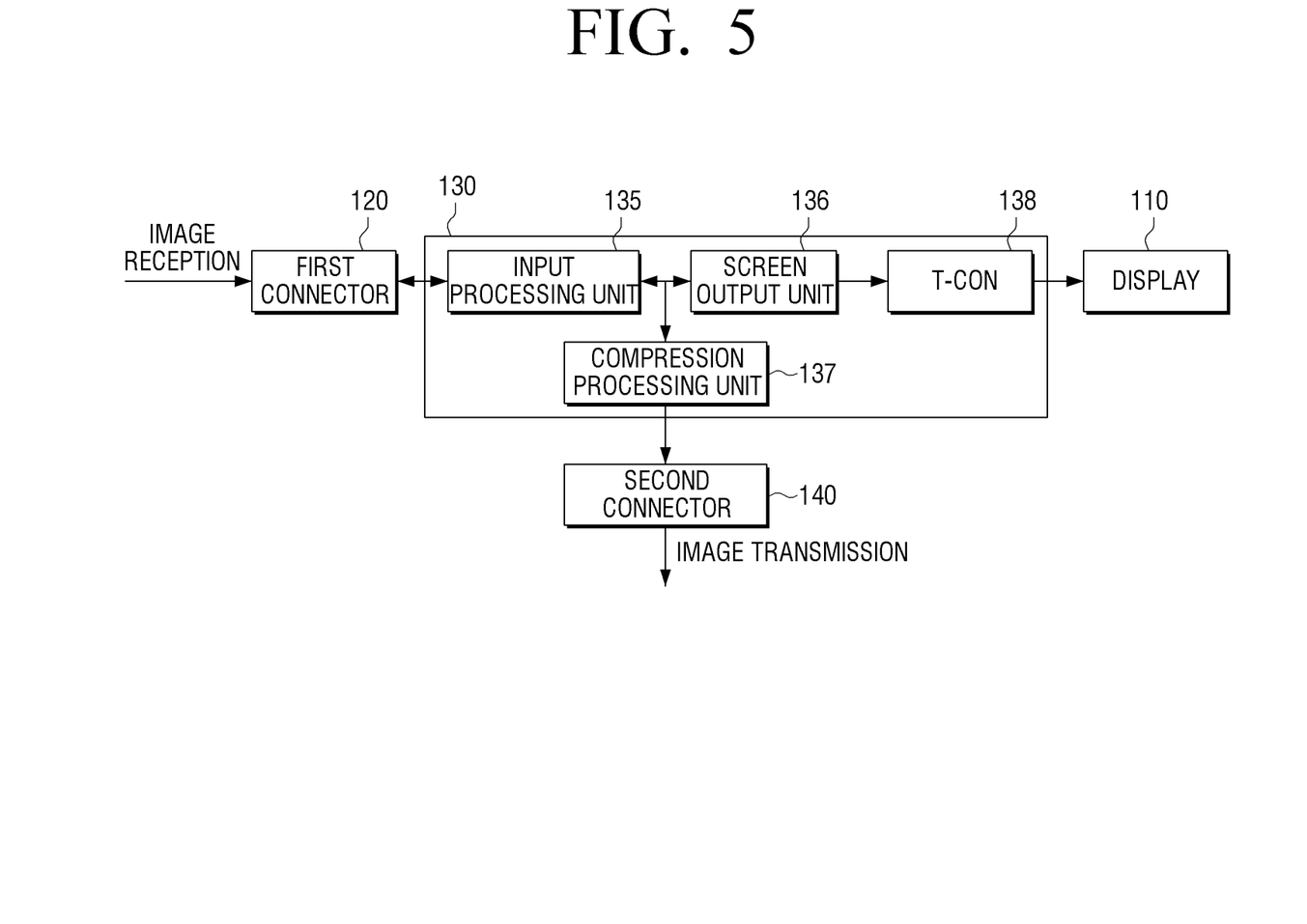
FIG. 5 is a block diagram illustrating a configuration of a processor according to an exemplary embodiment of the present disclosure in more detail.

FIG. 5 is a block diagram illustrating a configuration of a processor according to an exemplary embodiment of the present disclosure in more detail. Hereinafter, a description of portions overlapping with the description in FIG. 1 will be omitted. The processor 130 includes an input processing unit 135, a screen output unit 136, a compression processing unit 137, and T-CON 138. Here, the input processing unit 135, the screen output unit 136, and the compression processing unit 137 may be implemented as a microchip or an integrated circuit configuring the processor 130. FIG. 5 illustrates the input processing unit 135, the screen output unit 136, and the compression processing unit 137 as separate components, but the input processing unit 135, the screen output unit 136, and the compression processing unit 137 are not limited thereto, and the input processing unit 135, the screen output unit 136, and the compression processing unit 137 may be combined in various forms to configure system on chip (SoC). For example, the input processing unit 135 and the compression processing unit 137 may configure SoC and the screen output unit 136 may be implemented as a separate microchip. Alternatively, the input processing unit 135, the screen output unit 136, and the compression processing unit 137 may also configure single SoC.

A function of each of the components will be described. First, the input processing unit 135 may confirm a state of the image signal received through the first connector 120. Specifically, the input processing unit 135 determines whether or not the bandwidth used to transmit the image signal is within a bandwidth (hereinafter, referred to as an allowed bandwidth) supported by a TMDS based cable, and transmits the image to the screen output unit 136 and the compression processing unit 137 when the bandwidth used to transmit the image signal is within the allowed bandwidth. If the bandwidth used to transmit the image signal is not within the allowed bandwidth, the input processing unit 135 transmits the feedback signal to the first display apparatus 200 connected to the first connector 120.

Meanwhile, if the bandwidth used to transmit the image signal is within the allowed bandwidth but is close to the allowed bandwidth, the input processing unit 135 may also transmit a signal requesting a compression of the image to the compression processing unit 137.

The screen output unit 136 is a component that outputs the image received from the input processing unit 135 to the display 110. The screen output unit 136 may transmit the image to the display 110 through a timing controller 138, and may detect screen abnormality in which the image displayed on the display 110 is flickered or not output and inform the input processing unit 135 of the screen abnormality. In this case, the input processing unit 135 may transmit a feedback signal that informs error detection of the image to the first display apparatus 200 connected through the first connector 120.

The compression processing unit 137 may compress the image signal received from the input processing unit 135. Here, the compression rate may be changed to 1/2, 1/4, or the like based on an amount of error of the image signal. Here, the amount of error may mean a degree of frequency distortion of the image signal.

Further, when the compression processing unit 137 receives the feedback signal from the second display apparatus 300 connected through the second connector 140, the compression processing unit 137 may preferentially check whether or not screen abnormality occurs through the screen output unit 136. When the screen abnormality occurs, the compression processing unit 137 may transmit the feedback signal to the first display apparatus 200 through the input processing unit 135. Similarly to the display apparatus 100, the first display apparatus 200 receiving the feedback signal may detect the screen abnormality in which the image displayed on the display of the first display apparatus 200 is flickered or not output. If the screen abnormality is not detected, the first display apparatus 200 may transmit the feedback signal to a previous display apparatus or a sink device connected to the first connector 220 of the first display apparatus 200. That is, by a continuous operation of the respective display apparatuses as described above, the feedback signal may be transmitted to the display apparatus in which the screen abnormality is not detected in the reverse order of the order in which the image is transmitted. In a case in which the screen abnormality is not detected in any one display apparatus receiving the feedback signal, the compression of the image may be performed in the corresponding display apparatus and the compressed image may be again transmitted in the reverse order of the order in which the feedback signal is transmitted.

Meanwhile, when the screen abnormality does not occur in the display apparatus 100, the compression processing unit 137 may compress the image and transmit the compressed image to the second display apparatus 300 through the second connector 140.

Figure 6:
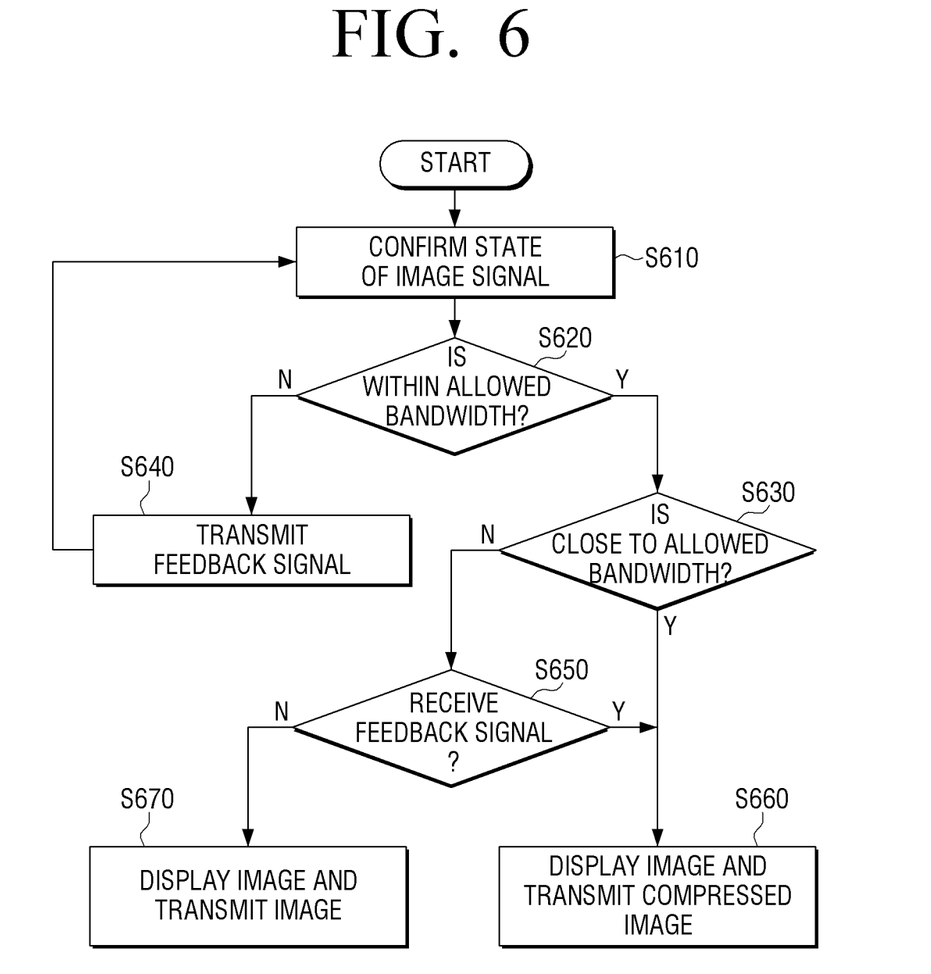
FIG. 6 is a flowchart for illustrating a process of transmitting a compressed image according to an exemplary embodiment of the present disclosure.

FIG. 6 is a flowchart for illustrating a process of transmitting a compressed image according to an exemplary embodiment of the present disclosure.

First, the display apparatus 100 confirms a state of the received image signal (S610). The state of the image signal means whether or not error occurs in the image signal, and may be confirmed by various error detection methods which are conventionally verified, such as a parity bit, a checksum, and CRC. The display apparatus 100 may determine the bandwidth of the image signal depending on the error detection and if it is determined the bandwidth of the image signal is within an allowed bandwidth (Yes in S620), the display apparatus 100 may secondly determine whether or not the bandwidth of the image signal is close to the allowed bandwidth (S630). If the bandwidth of the image signal is not close to the allowed bandwidth (No in S630), the display apparatus 100 determines whether or not a feedback signal is received (S650), and if the feedback signal is not received (No in S650), the display apparatus 100 displays the images and transmits the image to a subsequent display apparatus (S670). If the feedback signal is received (Yes in S650), the display apparatus 100 determines whether or not screen abnormality occurs, and if the screen abnormality does not occur, the display apparatus 100 displays the image, compresses the image, and transmits the compressed image to a subsequent display apparatus (S660). If the bandwidth of the image signal is close to the allowed bandwidth (Yes in S630), the display apparatus 100 displays the image, compresses the image, and transmits the compressed image to a subsequent display apparatus (S660) similarly to the case in which the bandwidth of the image signal is not close to the allowed bandwidth but the feedback signal is received.

Meanwhile, if the bandwidth of the image signal is not within the allowed bandwidth (No in S620), the display apparatus 100 transmits the feedback signal to a previous display apparatus and confirms the state of the compressed image signal re-received from the previous display apparatus (S640). The subsequent processes will be repeated in the same way as those described above.

Figure 7:
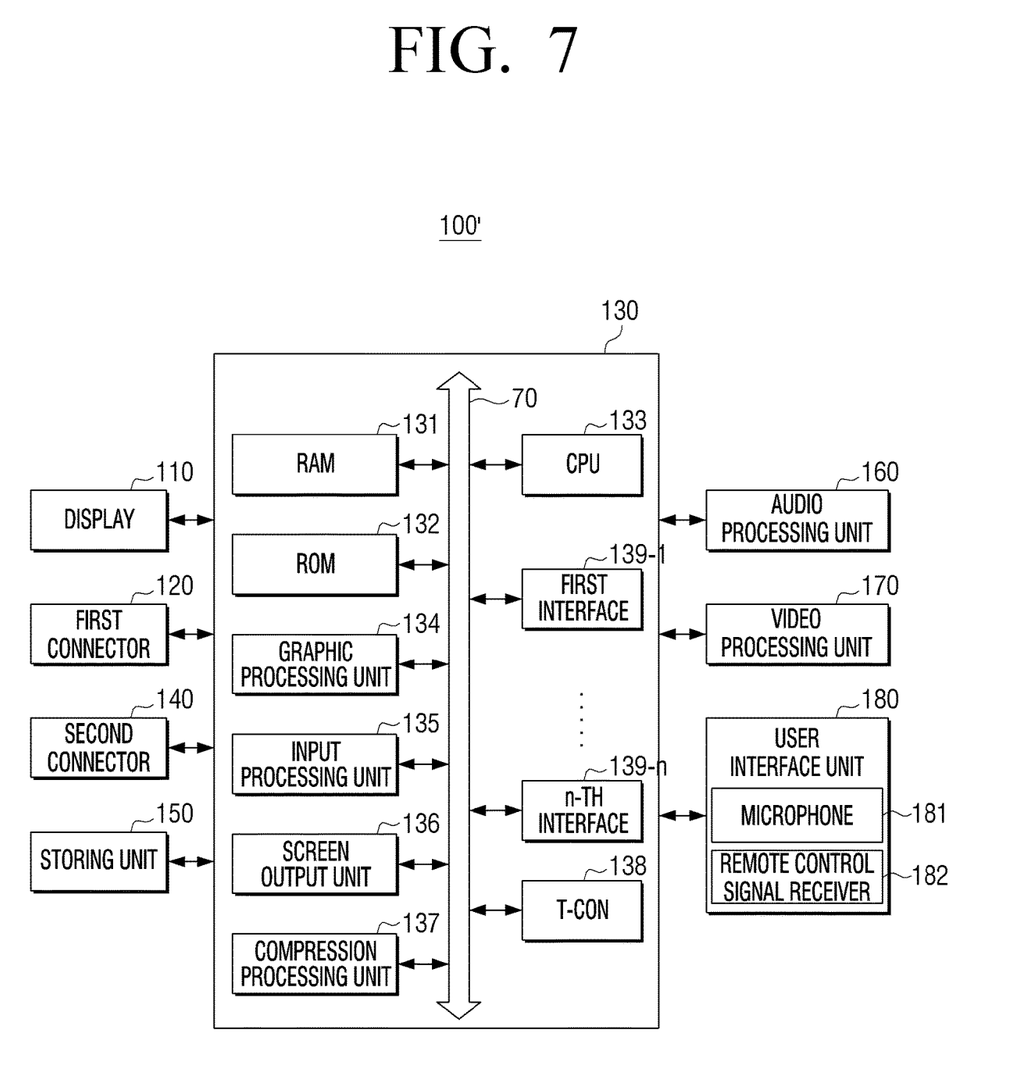
FIG. 7 is a block diagram illustrating a configuration of a display apparatus configuring a multi display system according to another exemplary embodiment of the present disclosure in detail.

FIG. 7 is a block diagram illustrating a configuration of a display apparatus configuring a multi display system according to another exemplary embodiment of the present disclosure in detail. As illustrated in FIG. 7, a display apparatus 100' according to another exemplary embodiment of the present disclosure includes the display 110, the first connector 120, the processor 130, the second connector 140, a storing unit 150, an audio processing unit 160, a video processing unit 170, and a user interface unit 180. Hereinafter, a description of portions overlapping with the description in FIG. 1 will be omitted.

The storing unit 150 is a component in which various modules for driving the display apparatus 100' are stored.

Specifically, the storing unit 150 may store a base module processing signals transmitted from the respective hardware included in the display apparatus 100', a storage module managing a database (DB) or a registry, a security module, a communications module, and the like.

The audio processing unit 160 is a component that processes audio data.

The video processing unit 170 is a component that performs various image processes such as decoding, scaling, noise filtering, frame rate converting, resolution converting, and the like for the input image.

The user interface unit 180 is a component for sensing a user interaction for controlling an overall operation of the display apparatus 100'. The user interface unit 180 may include various interaction sensing devices such as a microphone 181, a remote control signal receiver 182, and the like.

The processor 130 may control an overall operation of the display apparatus 100' using a variety of modules stored in the storing unit 150.

The processor 130 may include a RAM 131, a ROM 132, a CPU 133, a graphic processing unit 134, an input processing unit 135, a screen output unit 136, a compression processing unit 137, first to n-th interfaces 139-1 to 139-$n$, and the like as illustrated in FIG. 6. The RAM 131, the ROM 132, the CPU 133, the graphic processing unit 134, the input processing unit 135, the screen output unit 136, the compression processing unit 137, the first to n-th interfaces 139-1 to 139-$n$, and the like may be connected to each other through a bus 70. Hereinafter, a description of components overlapping with the description in FIG. 5 will be omitted.

The ROM 132 stores a set of instructions for booting a system, and the like. The CPU 133 copies a variety of application programs stored in the storing unit 150 in the RAM 131 and executes the application programs copied in the RAM 131 to perform a variety of operations.

The CPU 133 accesses the storing unit 150 and performs a booting using an operating system (O/S) stored in the storing unit 150. In addition, the CPU 133 performs various operations using a variety of programs, contents, data, and the like stored in the storing unit 150.

The graphic processing unit 134 generates a screen including various objects such as an icon, an image, a text, and the like using a calculator (not shown) and a renderer (not shown). The calculator calculates attribute values such as coordinate values, shapes, sizes, colors, and the like in which the respective objects are to be displayed according to a layout of the screen. The renderer generates the screen of various layouts including the objects based on the attribute values calculated by the calculator.

The first to n-th interfaces 139-1 to 139-$n$ are connected to the variety of components described above. One of the interfaces may be a network interface connected to an external device via a network.

Figure 8:
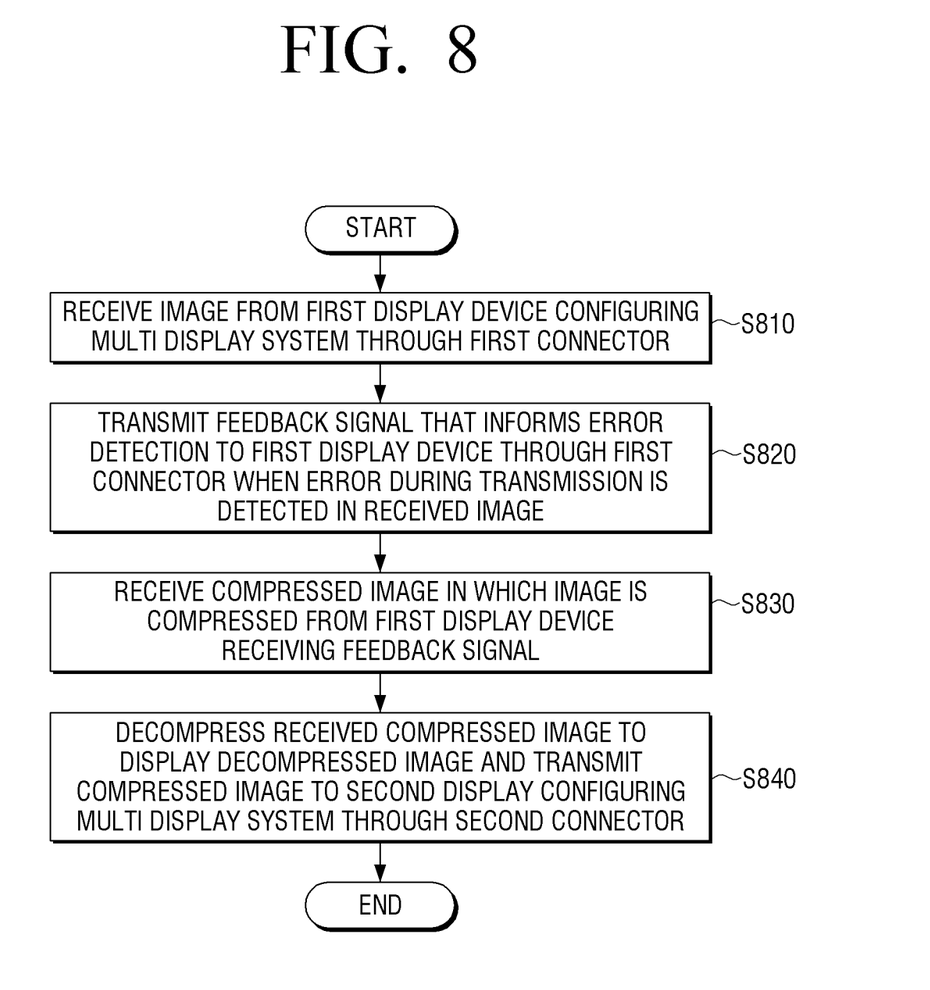
FIG. 8 is a flowchart illustrating a method for controlling a display apparatus configuring a multi display system according to an exemplary embodiment of the present disclosure.

FIG. 8 is a flowchart illustrating a method for controlling a display apparatus configuring a multi display system according to an exemplary embodiment of the present disclosure.

First, an image is received from a first display apparatus configuring a multi display apparatus through a first connector (S810).

Thereafter, if error during the transmission of the image is detected in the received image, a feedback signal that informs error detection is transmitted to the first display apparatus through the first connector (S820). Here, the error detection may be performed by a method of comparing a checksum included in the image.

Thereafter, a compressed image in which the image is compressed is received from the first display apparatus receiving the feedback signal (S830).

Thereafter, the compression of the received compressed image is decompressed and the decompressed image is displayed, and the compressed image is transmitted to the second display apparatus configuring the multi display system through the second connector (S840). Here, the first connector and the second connector may transmit and receive the image in a TMDS manner. Specifically, the first connector and the second connector may transmit and receive the image with the first display apparatus and the second display apparatus through a TMDS based HDMI or DVI cable. When the image is transmitted and received through the HDMI cable, the feedback signal is transmitted and received through a CEC channel, and when the image is transmitted and received through the DVI cable, the feedback signal may be a signal transmitted and received by toggling a GPIO port.

In this case, when the error is not detected in the received image, the image received from the first display apparatus is transmitted to the second display apparatus and the received image is displayed. When the compressed image is received from the first display apparatus, similarly, the error is detected and the same processes as those described above are repeatedly performed.

Meanwhile, when the feedback signal that informs the error detection is received from the second display apparatus, the compression of the image received from the first display apparatus may be performed and the compressed image may be re-transmitted to the second display apparatus. Here, the display apparatus may perform the compression by changing a compression rate based on an amount of detected error.

According to diverse exemplary embodiments of the present disclosure as described above, since an automatic recovery may be performed for a screen abnormal phenomenon according to an installation environment of a loop out display system, it is possible to increase the number of the display apparatuses capable of outputting the screen having a high resolution of image.

The method for controlling the display apparatus configuring the multi display system according to the diverse exemplary embodiments described above may be implemented in program and stored in various recording mediums. That is, computer programs processed by a variety of processors to execute the various control methods described above may also be used in a state in which they are stored in the recording medium.

As an example, a non-transitory computer readable medium having a program stored therein may be provided, the program includes an operation of receiving an image from a first display apparatus configuring a multi display system through a first connector, an operation of transmitting a feedback signal that informs error detection to the first display apparatus through the first connector when error during the transmission of the image is detected in the received image, an operation of receiving a compressed image in which the image is compressed from the first display apparatus receiving the feedback signal, and an operation of decompressing the compression of the received compressed image to display the decompressed image and transmitting the compressed image to a second display apparatus configuring the multi display system through a second connector.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should not be separately understood from the technical spirit and scope of the present disclosure.

What is claimed is:

1. A display apparatus of a multi display system, the display apparatus comprising:
    a display;
    a first connector;
    a second connector: and
    a processor configured to:
        receive an image through the first connector from a first display apparatus of the multi display system,
        based on an error being detected in the received image, transmit a feedback signal through the first connector to the first display apparatus,
        receive a compressed image, in which the image is compressed through the first connector from the first display apparatus,
        decompress the received compressed image,
        display the decompressed image through the display, and
        transmit the compressed image through the second connector to a second display apparatus of the multi display system,
        based on the error not being detected in the received image, identify a bandwidth required for transmitting the image,
        identify a difference between the identified bandwidth and a bandwidth of a cable connected to the second connector,
        based on the identified difference being smaller than a predetermined value, compress the image received from the first display apparatus and transmit the compressed image to the second display apparatus, and
        based on the identified difference being greater than the predetermined value, transmit the image received from the first display apparatus to the second display apparatus.

2. The display apparatus as claimed in claim 1, wherein the processor controls the display to transmit the received image to the second display apparatus and display the received image when no error is detected in the received image.

3. The display apparatus as claimed in claim 2, wherein the processor compresses the image received from the first display apparatus and re-transmits the compressed image to the second display apparatus when the feedback signal that informs the detection of the error is received from the second display apparatus.

4. The display apparatus as claimed in claim 1, wherein the error is detected during transmission of the image, and the first connector and the second connector transmit and receive the image in a transition minimized differential signaling (TMDS) manner.

5. The display apparatus as claimed in claim 4, wherein the first connector and the second connector transmit to and receive the image from the first display apparatus and the second display apparatus through a TMDS based high definition multimedia interface (HDMI) or digital visual interface (DVI) cable.

6. The display apparatus as claimed in claim 5, wherein the processor transmits and receives the feedback signal using a consumer electronics control (CEC) channel, when the first connector and the second connector transmit and receive the image through the HDMI cable.

7. The display apparatus as claimed in claim 5, wherein the processor transmits and receives a toggle signal of a general purpose input/output (GPIO) port as the feedback signal, when the first connector and the second connector transmit and receive the image through the DVI cable.

8. The display apparatus as claimed in claim 1, wherein the processor determines whether the error occurs during transmission of the image by using any one or more error detection method of a parity bit, a checksum, and cyclic redundancy checks (CRC).

9. The display apparatus as claimed in claim 5, wherein the processor compresses the received image and transmits the compressed image to the second display apparatus, when determining a bandwidth required to transmit the image is close to a bandwidth supported by the HDMI or the DVI, based on a frequency of the received image.

10. The display apparatus as claimed in claim 3, wherein the processor compresses the received image by changing a compression rate based on characteristic information of the error detected.

11. A method for controlling a display apparatus of a multi display system, the method comprising:
    receiving an image from a first display apparatus of the multi display system through a first connector;
    based on an error being detected in the received image, transmitting a feedback signal comprising information on a bandwidth of a cable connected to the first connector through the first connector to the first display apparatus;
    receiving a compressed image in which the image is compressed based on the bandwidth of the cable from the first display apparatus through the first connector;
    decompressing the received compressed image to display the decompressed image and transmitting the compressed image second connector to a second display apparatus of the multi display system through a second connector,
    based on the error not being detected in the received image, identifying a bandwidth required for transmitting the image,
    identifying a difference between the identified bandwidth and a bandwidth of a cable connected to the second connector,
    based on the identified difference being smaller than a predetermined value, compressing the imaqe received from the first display apparatus and transmitting the compressed image to the second display apparatus, and
    based on the identified difference being greater than the predetermined value, transmittinq the image received from the first display apparatus to the second display apparatus.

12. The method as claimed in claim 11, further comprising transmitting the received image to the second display apparatus and displaying the received image when no error is detected in the received image.

13. The method as claimed in claim 12, further comprising:
    compressing the image received from the first display apparatus when the feedback signal that informs the detection of the error is received from the second display apparatus; and
    re-transmitting the compressed image to the second display apparatus.

14. The method as claimed in claim 11, wherein the error is detected during transmission of the image, and the first connector and the second connector transmit and receive the image in a transition minimized differential signaling (TMDS) manner.

15. The method as claimed in claim 14, wherein the first connector and the second connector transmit to and receive the image from the first display apparatus and the second display apparatus through a TMDS based high definition multimedia interface (HDMI) or digital visual interface (DVI) cable.

16. The method as claimed in claim 15, wherein the feedback signal is a signal transmitted and received through a consumer electronics control (CEC) channel when the image is transmitted and received through the HDMI cable.

17. The method as claimed in claim 15, wherein the feedback signal is a signal transmitted and received by toggling a general purpose input/output (GPIO) port when the image is transmitted and received through the DVI cable.

18. The method as claimed in claim 11, wherein in the transmitting of the feedback signal, determining whether the error occurs during transmission by using any one or more error detection method of a parity bit, a checksum, and cyclic redundancy checks (CRC).

19. The method as claimed in claim 15, further comprising:
    determining whether a bandwidth required to transmit the image is close to a bandwidth supported by the HDMI or the DVI based on a frequency of the received image when no error is detected in the received image; and
    compressing the received image and transmitting the compressed image to the second display apparatus when it is determined that the bandwidth required to transmit the image is close to the bandwidth supported by the HDMI or the DVI.

20. The method as claimed in claim 13, wherein in the compressing of the image, the received image is compressed by changing a compression rate based on characteristic information of the error detected.

* * * * *